US012533784B2

(12) United States Patent
McConeghy et al.

(10) Patent No.: US 12,533,784 B2
(45) Date of Patent: Jan. 27, 2026

(54) SHADOWLESS LIGHTING DESIGN FOR A POWER TOOL

(71) Applicant: MILWAUKEE ELECTRIC TOOL CORPORATION, Brookfield, WI (US)

(72) Inventors: Ian McConeghy, Mequon, WI (US); Bryan C. Kendall, Lisbon, WI (US); Jesse A. Gibb, Milwaukee, WI (US); Jeffery D. Spraggon, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/675,298

(22) Filed: May 28, 2024

(65) Prior Publication Data

US 2024/0399551 A1 Dec. 5, 2024

Related U.S. Application Data

(60) Provisional application No. 63/513,714, filed on Jul. 14, 2023, provisional application No. 63/505,025, filed on May 30, 2023.

(51) Int. Cl.
*F21V 33/00* (2006.01)
*B25D 16/00* (2006.01)
*B25D 17/00* (2006.01)

(52) U.S. Cl.
CPC ......... *B25D 17/005* (2013.01); *B25D 16/006* (2013.01); *B25D 2216/0015* (2013.01);
(Continued)

(58) Field of Classification Search
CPC .... B25B 23/18; B25D 16/006; B25D 17/005; B25D 2216/0015; B25D 2216/0023; B25D 2216/0038
See application file for complete search history.

(56) References Cited

U.S. PATENT DOCUMENTS 6,443,675 B1 * 9/2002 Kopras .................. B25F 5/026 409/137
6,622,537 B2 * 9/2003 Rodriguez ............. E05B 17/10 70/462

(Continued)

FOREIGN PATENT DOCUMENTS

| | | | |
|---|---|---|---|
| CN | 205588244 U | 9/2016 |
| CN | 208961941 U | 6/2019 |
| CN | 115446785 A | 12/2022 |

*Primary Examiner* — Anna K Kinsaul
*Assistant Examiner* — David G Shutty
(74) *Attorney, Agent, or Firm* — Quarles & Brady LLP

(57) ABSTRACT

A rotary hammer includes a housing including a motor housing and a secondary housing. The rotary hammer includes an output device configured to provide a rotational output, an axial hammering output, or both the rotational output and the axial hammering output. The rotary hammer also includes a transmission mechanism situated within the secondary housing. The rotary hammer also includes a light holder with a plurality of light sources distributed around an output axis of the rotary hammer. The light holder includes a ring portion mounted to a front surface of the secondary housing. The light holder also includes an extending arm that extends downward and away from the ring portion in a channel of the secondary housing. The rotary hammer includes lighting power wires that are located within the channel and that are covered by the extending arm.

19 Claims, 15 Drawing Sheets

(52) U.S. Cl.
CPC ................ *B25D 2216/0023* (2013.01); *B25D 2216/0038* (2013.01)

(56) References Cited

U.S. PATENT DOCUMENTS

| | | | | |
|---|---|---|---|---|
| 6,905,221 | B2 * | 6/2005 | Hsu | B25B 23/18 362/120 |
| 6,981,779 | B2 | 1/2006 | Fukuoka | |
| 7,200,516 | B1 * | 4/2007 | Cowley | G01S 17/875 356/138 |
| 7,677,752 | B2 | 3/2010 | Tadokoro et al. | |
| 7,850,325 | B2 * | 12/2010 | Wall | B25F 5/021 362/120 |
| 8,317,350 | B2 * | 11/2012 | Friedman | B23Q 17/2404 362/120 |
| 8,328,381 | B2 * | 12/2012 | Dixon | B25F 5/021 362/120 |
| 8,371,848 | B2 * | 2/2013 | Okawa | A61B 1/24 433/29 |
| 8,496,366 | B2 * | 7/2013 | Leong | B25B 21/02 362/446 |
| 8,607,893 | B2 * | 12/2013 | Kumagai | B25F 5/02 173/90 |
| 8,820,955 | B2 * | 9/2014 | Dixon | F21V 33/0084 362/119 |
| 8,827,483 | B2 * | 9/2014 | Dixon | B25F 5/021 362/109 |
| 9,028,088 | B2 * | 5/2015 | Vanko | B25F 5/00 362/120 |
| 9,114,512 | B2 | 8/2015 | Beer et al. | |
| 9,302,376 | B2 * | 4/2016 | Agehara | B25F 5/021 |
| 9,539,691 | B2 * | 1/2017 | Hirschburger | B23Q 17/2404 |
| 10,040,181 | B2 * | 8/2018 | Fu | B25F 5/021 |
| 10,052,733 | B2 * | 8/2018 | Ely | B25B 23/18 |
| 10,207,380 | B2 * | 2/2019 | Billings | F21V 23/0471 |
| 10,525,582 | B2 * | 1/2020 | Qiu | B23D 59/002 |
| 10,615,670 | B2 | 4/2020 | Madineni et al. | |
| 10,821,595 | B2 * | 11/2020 | Qiu | B25B 21/00 |
| 10,836,019 | B2 | 11/2020 | Matsushita et al. | |
| 11,280,488 | B2 * | 3/2022 | Niwa | F21V 13/045 |
| 11,433,525 | B2 * | 9/2022 | Niwa | H02K 21/16 |
| 11,772,245 | B2 * | 10/2023 | Fischer | B25B 21/023 173/117 |
| 11,890,731 | B2 * | 2/2024 | Hozumi | B25B 23/18 |
| 11,958,170 | B2 * | 4/2024 | Hirabayashi | B25B 23/18 |
| 2005/0132589 | A1 * | 6/2005 | Johnson | B25H 1/0092 33/286 |
| 2011/0058356 | A1 * | 3/2011 | Friedman | B25F 5/021 362/119 |
| 2013/0021783 | A1 * | 1/2013 | Vanko | B25B 21/00 362/119 |
| 2013/0197317 | A1 * | 8/2013 | Daniel | A61B 1/0684 600/249 |
| 2016/0354889 | A1 * | 12/2016 | Ely | B23Q 17/2404 |
| 2021/0260733 | A1 * | 8/2021 | Fischer | B25F 5/02 |
| 2022/0388134 | A1 | 12/2022 | Hozumi | |
| 2023/0366535 | A1 * | 11/2023 | Chikaraishi | H05B 47/105 |
| 2024/0123585 | A1 * | 4/2024 | Ogiso | B25B 23/18 |

* cited by examiner

SHADOWLESS LIGHTING DESIGN FOR A POWER TOOL

RELATED APPLICATIONS

This application claims priority to U.S. Provisional Application No. 63/505,025, filed on May 30, 2023, and to U.S. Provisional Application No. 63/513,714, filed on Jul. 14, 2023, the entire contents of each of which are hereby incorporated by reference.

FIELD OF THE INVENTION

Some disclosed embodiments relate to a handheld power tool that includes a lighting assembly. Specifically, some disclosed embodiments relate to a power tool that includes a shadowless work light assembly configured to illuminate a work area.

SUMMARY

Handheld power tools may include one or more work lights configured to illuminate a working area of the power tool. For example, a power tool may include a single work light positioned near an output device of the power tool to illuminate an area on which the output unit is providing an output (e.g., drilling into a work piece, securing a fastener in a work piece, or the like).

Some power tools may include a work light located on a front surface of the power tool and configured to illuminate a working area of the power tool. For example, a rotary hammer may include a single light-emitting diode (LED) positioned near an output device that is configured to transfer rotational energy from the rotary hammer to a work piece. While the rotary hammer is being operated by a user, the LED may illuminate the work piece so that the user can more easily see the work piece. However, using a single LED may cause a shadow to be cast by the output device, which can negatively affect the visibility of the fastener. To address this problem, a power tool may include multiple LEDs positioned radially around the output device or end tool of the power tool. Providing multiple LEDs around the output device creates even lighting applied to all sides of the output unit or end tool, which prevents shadows from being cast. This type of lighting may be generally referred to as shadowless lighting.

While shadowless lighting helps to improve the visibility of the fastener and/or work area, implementing shadowless lighting in a power tool (e.g., on a front surface of a gear case) can raise additional issues. For example, each LED mounted to the front surface of the power tool may require multiple wires to provide power and/or control signals to the LEDs. As more LEDs are included, more wires may be needed. Therefore, power tools implementing shadowless lighting require an efficient method to locate these wires in the limited space provided within a handheld power tool.

One embodiment provides a rotary hammer that may include a housing including a motor housing and a secondary housing. The rotary hammer may also include a motor situated within the motor housing. The rotary hammer may also include an output device configured to provide a rotational output, an axial hammering output, or both the rotational output and the axial hammering output. The rotary hammer may also include a transmission mechanism configured to transmit rotational energy from the motor to the output device of the rotary hammer. At least a portion of the transmission mechanism may be situated within the secondary housing. The rotary hammer may also include a light holder that includes a plurality of light sources distributed around an output axis of the rotary hammer on which the output device is located. The light holder may include a ring portion mounted to a front surface of the secondary housing. The ring portion may surround the output axis. The light holder may also include an extending arm that extends downward and away from the ring portion in a channel of the secondary housing. The channel may be formed by protrusions on a bottom peripheral surface of the secondary housing. The extending arm may extend rearwardly at least halfway along an axial length of the secondary housing in a direction parallel to the output axis. The rotary hammer may also include lighting power wires configured to provide power to the plurality of light sources. The lighting power wires may be located within the channel and may be covered by the extending arm. The light holder may also include a first substrate located at a bottom of a rear surface of the ring portion. A first light source may be mounted to the first substrate. The light holder also may include a second substrate located on the rear surface of the ring portion. A second light source may be mounted to the second substrate. The light holder also may include a third substrate located on the rear surface of the ring portion. A third light source may be mounted to the third substrate. The lighting power wires may couple to the first substrate. A first additional set of lighting power wires may be coupled to the first substrate and the second substrate. A second additional set of lighting power wires may be coupled to the first substrate and the third substrate.

In addition to any combination of features described above, the secondary housing may include a hole at a rear of the channel through which the lighting power wires enter the housing of the rotary hammer.

In addition to any combination of features described above, a rear end of the extending arm may be configured to be inserted into the hole at the rear of the channel of the secondary housing.

In addition to any combination of features described above, the first substrate may be a different shape than the second substrate and the third substrate.

In addition to any combination of features described above, the second light source and the third light source may be electrically connected in parallel with each other.

Another embodiment provides a rotary hammer that may include a housing including a motor housing and a secondary housing. The rotary hammer may also include a motor situated within the motor housing. The rotary hammer may also include an output device configured to provide a rotational output, an axial hammering output, or both the rotational output and the axial hammering output. The rotary hammer may also include a transmission mechanism configured to transmit rotational energy from the motor to the output device of the rotary hammer. At least a portion of the transmission mechanism may be situated within the secondary housing. The rotary hammer may also include a light holder that includes a plurality of light sources distributed around an output axis of the rotary hammer on which the output device is located. The light holder may includes a ring portion mounted to a front surface of the secondary housing. The ring portion may surround the output axis. The light holder also may include an extending arm that extends downward and away from the ring portion in a channel of the secondary housing. The channel may be formed by protrusions on a bottom peripheral surface of the secondary housing. The extending arm may extend rearwardly at least halfway along an axial length of the secondary housing in a direction parallel to the output axis. The rotary hammer may also include lighting power wires configured to provide power to the plurality of light sources. The lighting power wires may be located within the channel and may be covered by the extending arm. The ring portion may include a plurality of through-holes that are each configured to receive a fastener. Each fastener may be received in a respective hole on the front surface of the secondary housing to secure the light holder to the secondary housing.

In addition to any combination of features described above, the secondary housing may include a hole at a rear of the channel through which the lighting power wires enter the housing of the rotary hammer.

In addition to any combination of features described above, a rear end of the extending arm may be configured to be inserted into the hole at the rear of the channel of the secondary housing.

In addition to any combination of features described above, the light holder may include a first substrate located at a bottom of a rear surface of the ring portion. A first light source may be mounted to the first substrate. The light holder may also include a second substrate located on the rear surface of the ring portion. A second light source may be mounted to the second substrate. The light holder may also include a third substrate located on the rear surface of the ring portion. A third light source may be mounted to the third substrate. The lighting power wires may couple to the first substrate. A first additional set of lighting power wires may be coupled to the first substrate and the second substrate. A second additional set of lighting power wires may be coupled to the first substrate and the third substrate.

In addition to any combination of features described above, a rear surface of the ring portion may include a plurality of indented portions that are each configured to receive a lens. Each lens may include an outer peripheral surface with a protrusion. The protrusion may be configured to fit into an indent on an inner peripheral surface of the ring portion. The lens may be configured to receive a substrate. A first light source may be mounted to the substrate.

Another embodiment provides a rotary hammer that may include a housing including a motor housing and a secondary housing. The rotary hammer may also include a motor situated within the motor housing. The rotary hammer may also include an output device configured to provide a rotational output, an axial hammering output, or both the rotational output and the axial hammering output. The rotary hammer may also include a transmission mechanism configured to transmit rotational energy from the motor to the output device of the rotary hammer. At least a portion of the transmission mechanism may be situated within the secondary housing. The rotary hammer may also include a light holder that may include a plurality of light sources distributed around an output axis of the rotary hammer on which the output device is located. The light holder may include a ring portion mounted to a front surface of the secondary housing. The ring portion may surround the output axis. The light holder may also include an extending arm that extends downward and away from the ring portion in a channel of the secondary housing. The channel may be formed by protrusions on a bottom peripheral surface of the secondary housing. The rotary hammer may also include lighting power wires that are configured to provide power to the plurality of light sources. The lighting power wires may be located within the channel and may be covered by the extending arm.

In addition to any combination of features described above, the secondary housing may include a hole at a rear of the channel through which the lighting power wires enter the housing of the rotary hammer.

In addition to any combination of features described above, a rear end of the extending arm may be configured to be inserted into the hole at the rear of the channel of the secondary housing.

In addition to any combination of features described above, the channel in the secondary housing may include a shelf configured to hold a substrate on which a sensor is mounted.

In addition to any combination of features described above, the extending arm may extend rearwardly at least halfway along an axial length of the secondary housing in a direction parallel to the output axis.

In addition to any combination of features described above, the light holder may include a first substrate located at a bottom of a rear surface of the ring portion. A first light source may be mounted to the first substrate. The light holder may also include a second substrate located on the rear surface of the ring portion. A second light source may be mounted to the second substrate. The light holder may also include a third substrate located on the rear surface of the ring portion. A third light source may be mounted to the third substrate. The lighting power wires may couple to the first substrate. A first additional set of lighting power wires may be coupled to the first substrate and the second substrate. A second additional set of lighting power wires may be coupled to the first substrate and the third substrate.

In addition to any combination of features described above, the first substrate may be a different shape than the second substrate and the third substrate.

In addition to any combination of features described above, the second light source and the third light source may be electrically connected in parallel with each other.

In addition to any combination of features described above, the ring portion may include a plurality of through-holes that are each configured to receive a fastener. Each fastener may be received in a respective hole on the front surface of the secondary housing to secure the light holder to the secondary housing.

In addition to any combination of features described above, a rear surface of the ring portion may include a plurality of indented portions that are each configured to receive a lens. Each lens may include an outer peripheral surface with a protrusion. The protrusion may be configured to fit into an indent on an inner peripheral surface of the ring portion. The lens may be configured to receive a substrate. A first light source may be mounted to the substrate.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
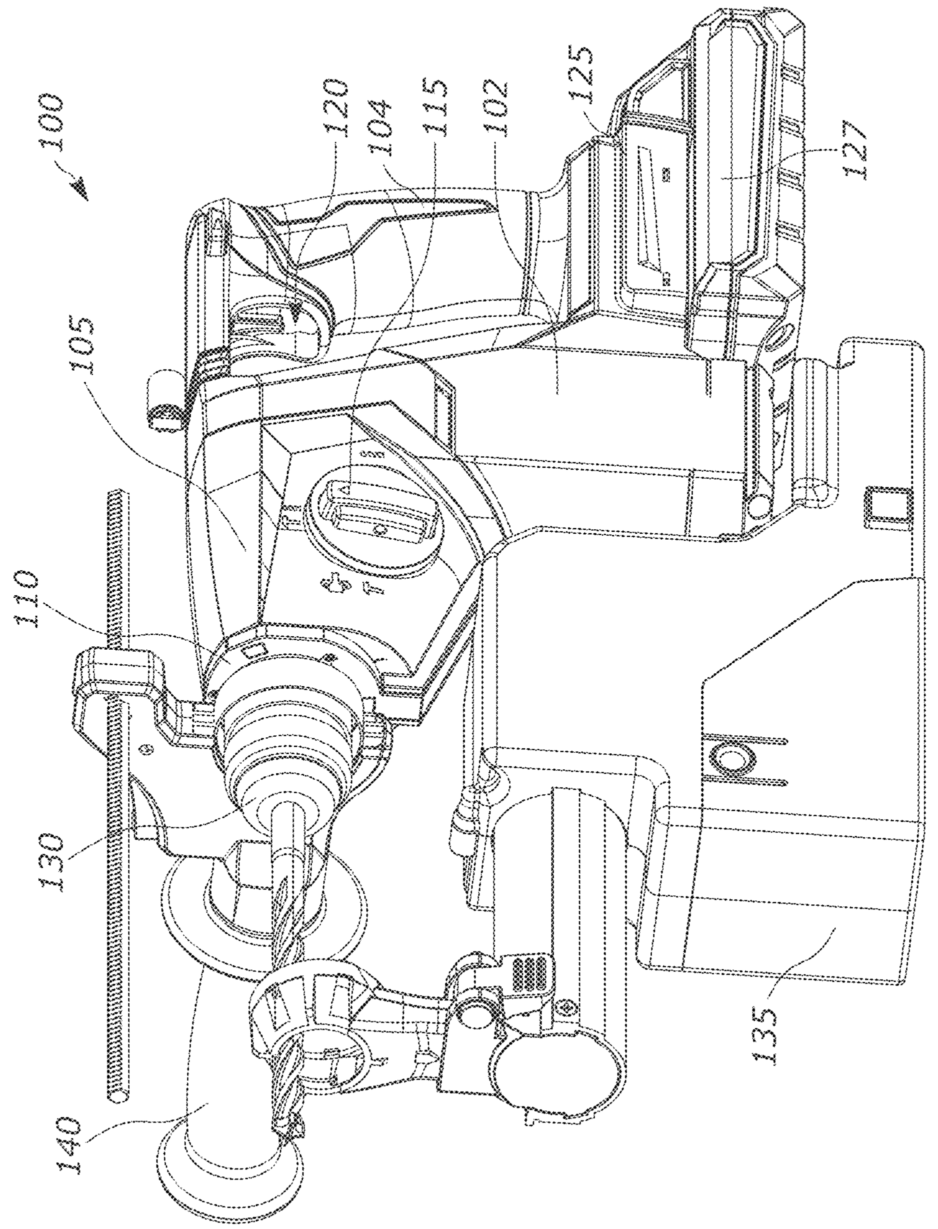
FIG. 1 illustrates a perspective view of a power tool, according to some embodiments described herein.
Figure 2A:
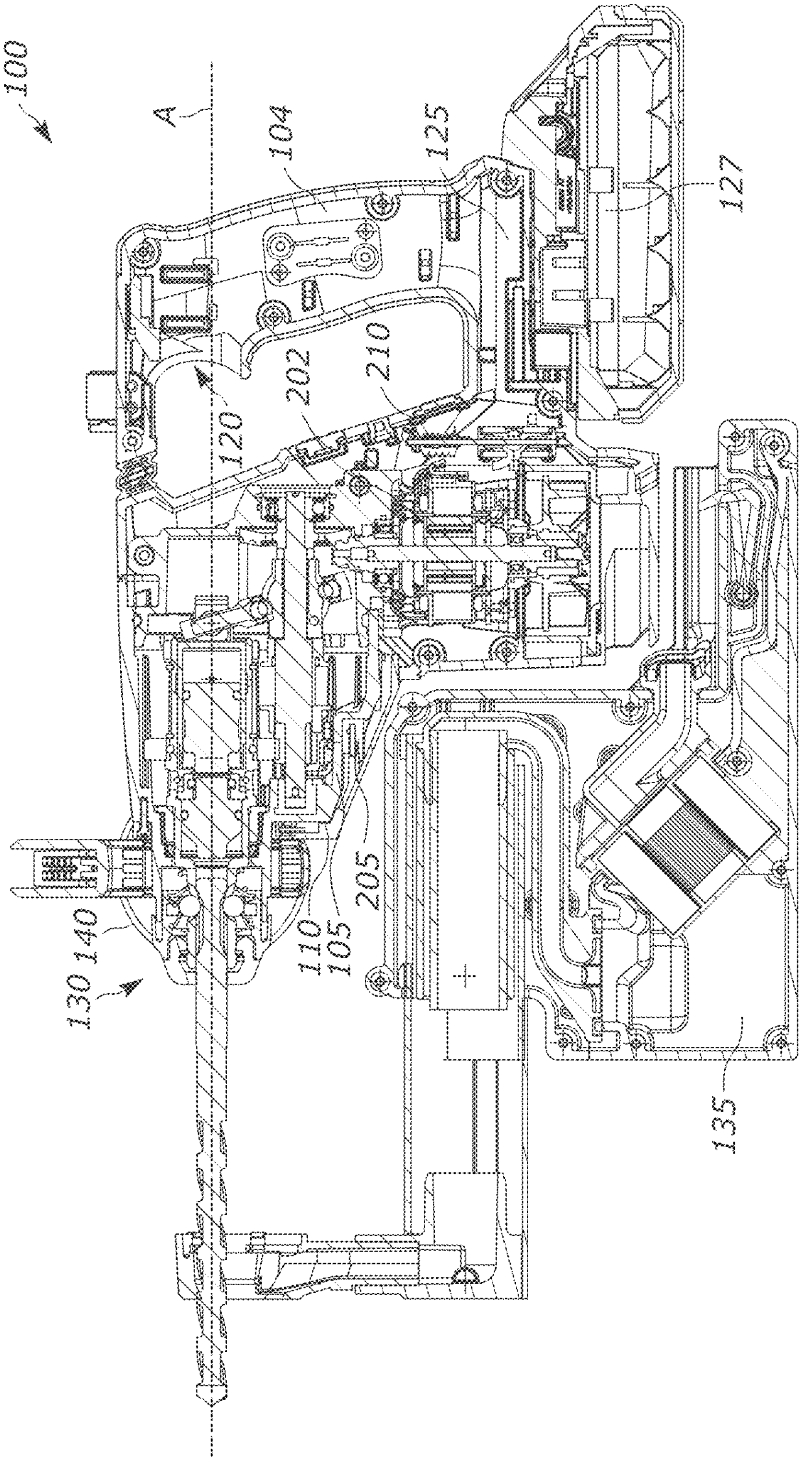
FIGS. 2A and 2B illustrate cross-sectional views of the power tool of FIG. 1, according to some embodiments described herein.

FIG. 1 illustrates a power tool 100 that includes a lighting assembly/system (e.g., a work light assembly) according to one example embodiment. The power tool 100 includes a housing that may include a clamshell housing 102 and a gear case 105, among other parts. The clamshell housing 102 may be configured to house a motor 202 (e.g., a brushed motor, a brushless direct current (BLDC) motor, or the like). A portion of the housing that is configured to house the motor 202 may be referred to as a motor housing or main body of the power tool 100. In some embodiments, the housing may be formed from two pieces of plastic configured to mate (e.g., a clamshell housing 102), such that an interior cavity is formed within the housing. A portion of the housing may be formed into a handle 104 to allow a user to hold the power tool 100. A trigger 120 may be positioned on the handle 104 to allow a user to actuate the trigger 120 to variably control at least one parameter of the power tool 100. In FIGS. 1 and 2A, the trigger 120 is not shown but the reference number 120 is nevertheless used to indicate where the trigger 120 is located. In some embodiments, the parameter may be an amount of power supplied to the motor 202 of the power tool 100.

The housing may further include a connection portion (e.g., a battery pack interface 125) that may include an interface (not shown) configured to removably couple to a battery pack 127. The interface may include electrical contacts to allow power to be transferred from the battery pack 127 to the power tool 100 (e.g., to provide power to the motor 202 and other components of the power tool 100). The battery pack interface 125 may be coupled to the handle 104 and may be located underneath the handle 104 as shown in FIGS. 1 and 2A.

The power tool 100 also may include an output device 130 (e.g., a blade/bit/tool holder) on one end of the housing (e.g., an output end of the housing) to provide an output of the power tool 100. For example, the output device 130 of the power tool 100 shown in FIG. 1 is configured to hold a drill bit, and the output of the power tool 100 shown in FIG. 1 is rotational and/or axial/translational output. However, the output device 130 may be configured to hold other types of tools, bits, etc. and/or may be configured to provide other types of output (e.g., a rotational impacting output, a reciprocating output, and/or the like) for other types of power tools 100. In some embodiments, the output device 130 may include a fitting (e.g., a chuck, a collet, or the like) to removably couple an end tool (e.g., a saw blade, a tool bit, etc.) to the output device 130. In other embodiments, the output device 130 may be formed such that a fastener directly removably couples to the output device 130 to perform a loosening or tightening operation of the fastener, a drilling of a hole in a work piece, etc. In some instances, the positioning of different portions of the power tool 100 (e.g., the motor housing, the handle 104, the output device 130, etc.) may be different than that shown in FIG. 1, for example, for different types of power tools 100.

Figure 2B:
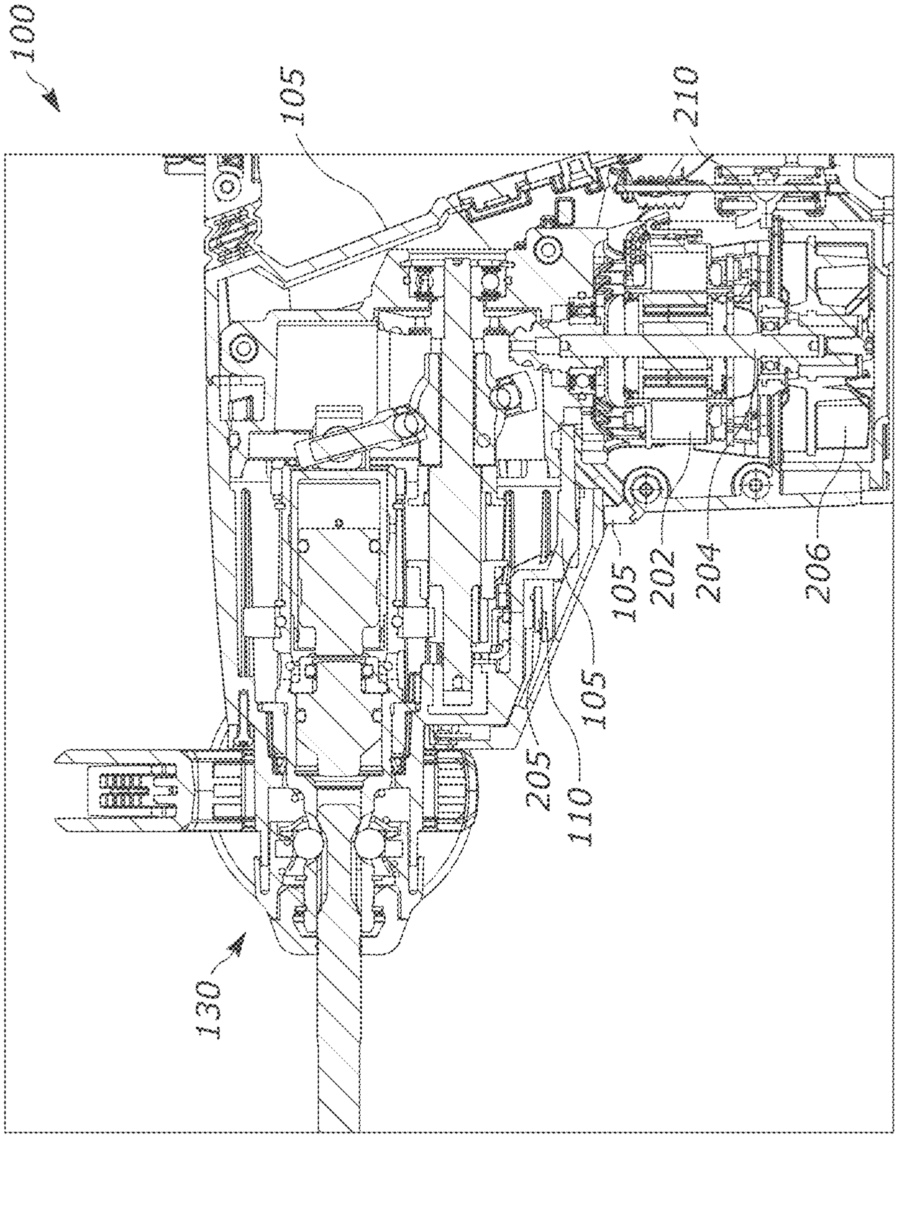

The power tool 100 may further include a work light assembly that includes a light holder 110 located on a front surface 420 of the gear case 105. The light holder 110 may include a ring/circular portion 505 (see FIGS. 5A-5C) that surrounds an output axis A (see FIG. 2A) of the power tool 100 about which the output device 130 of the power tool 100 rotates. The light holder 110 may include an extending arm 510 (see FIGS. 5A-5C) that extends along a bottom peripheral surface 425 of the gear case 105 as shown in FIGS. 1-2B. The light holder 110 may include three openings that are each configured to receive a lens 520 and a PCB/substrate 525 on which a light emitting diode (LED) 330 is mounted (see FIG. 5B). The LEDs 330 may provide light through the lenses 520 to illuminate a work area in an approximately shadowless manner, for example, in response to the trigger 120 being actuated.

The power tool 100 may also include a user input device 115 (e.g., a user input dial 115) to allow a user to adjust an operating mode of the power tool 100. For example, the user input dial 115 is configured to be rotated to select one of a plurality of modes of the power tool. Such modes may include a hammer only mode (e.g., only axial hammering movement of an output shaft of the power tool 100), a rotation only mode (e.g., only rotational movement of the output shaft), or a rotary hammer mode (e.g., both rotational and axial movement of the output shaft).

The power tool 100 optionally includes a dust extractor attachment 135 and an auxiliary handle 140. These components 135 and 140 may be removably attached to the power tool 100 in some instances. However, the power tool 100 may operate without one or both of these components 135 and 140 in some instances. In some instances, when the power tool 100 is a different type of power tool, the different type of power tool may not be configured to receive one or both of the components 135 and 140.

The particular power tool 100 illustrated and described herein (e.g., rotary hammer) is merely an example. The work light assembly disclosed herein may also be implemented on other types of power tool devices including other power tools, battery packs, battery chargers, other power tools, test and measurement equipment, vacuum cleaners, worksite radios, outdoor power equipment, non-motorized tools for task lighting applications, and vehicles. Power tools can include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, sanders, trim routers, and the like. Battery chargers can include wall chargers, multi-port chargers, travel chargers, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. Other non-motorized devices may include electronic key boxes, calculators, cellular phones, head phones, cameras, motion sensing alarms, flashlights, worklights, weather information display devices, a portable power source, a digital camera, a digital music player, a radio, and multi-purpose cutters.

FIGS. 2A and 2B illustrate cross-sectional views of the power tool 100 according to one example embodiment. The power tool 100 includes the motor 202 configured to provide a rotational and/or axial output to an output device 130 of the power tool 100. A motor shaft 204 that defines an axis of rotation of the motor 202 may extend in an up-down direction that is perpendicular to the output axis A of the power tool 100. The power tool 100 may include a transmission mechanism/device configured to transfer the rotational output/energy of the motor 202 to another type of motion of the output device 130 (e.g., axial motion) and/or in a different direction (e.g., to cause the rotation of the output shaft to cause rotation of the output device 130 about the output axis A). The transmission mechanism may be a gear transmission mechanism, an electronic transmission mechanism, an impacting transmission, a scotch-yoke mechanism, a combination of multiple types of transmission mechanisms, or the like. In some instances, the transmission mechanism may merely include a connection between a motor spindle/shaft 204 and an output spindle (or a single motor/output spindle), for example, for tools that have direct drive operation. In some instances, at least a portion of the transmission mechanism may be positioned within a separate secondary housing 105 such as the gear case 105. In some instances, the power tool 100 may also include a fan 206 located on the motor shaft 204 and configured to rotate to circulate air within the housing of the power tool 100 to cool internal components.

As shown in FIGS. 2A-2B, the power tool 100 may further include a printed circuit board (PCB) 205 and a PCB 210. The PCB 210 may include one or more electronic components that may implement a control system of the power tool 100 such as power switching elements 345 (e.g., field-effect transistors 345) (see FIG. 3) to provide power to the motor 202, an electronic processor 350 (see FIG. 3) to control the power switching elements 345, and/or the like. In some embodiments, the PCB 205 includes a magnetic sensor (e.g., a Hall sensor) configured to sense a magnetic element included on the user input dial 115. The PCB 205 may be electrically coupled to the electronic processor 350 to allow the electronic processor 350 to determine a selected mode in which the power tool 100 should operate based on the detected position of the user input dial 115 (e.g., based on a detected position of the magnetic element included in/on the user input dial 115). In some embodiments, the power tool 100 may include more than two PCBs 205, 210 located in other portions of the housing. In some embodiments, either of the PCBs 205, 210 may be located in a different portion of the housing. In some embodiments, the electronic processor 350 is configured to receive power from a power supply connected to the power tool 100 (e.g., a battery pack 127 connected to the power tool 100 via the interface 125). The electronic processor 350 may be configured to control whether power is provided to one or more of the motor 202 and/or the light sources 330 of the work light assembly. In some embodiments, the PCBs 205, 210 may include additional or alternative components. For example, some or all of the components located on the PCB 210 may be located on another PCB within the power tool 100.

Figure 3:
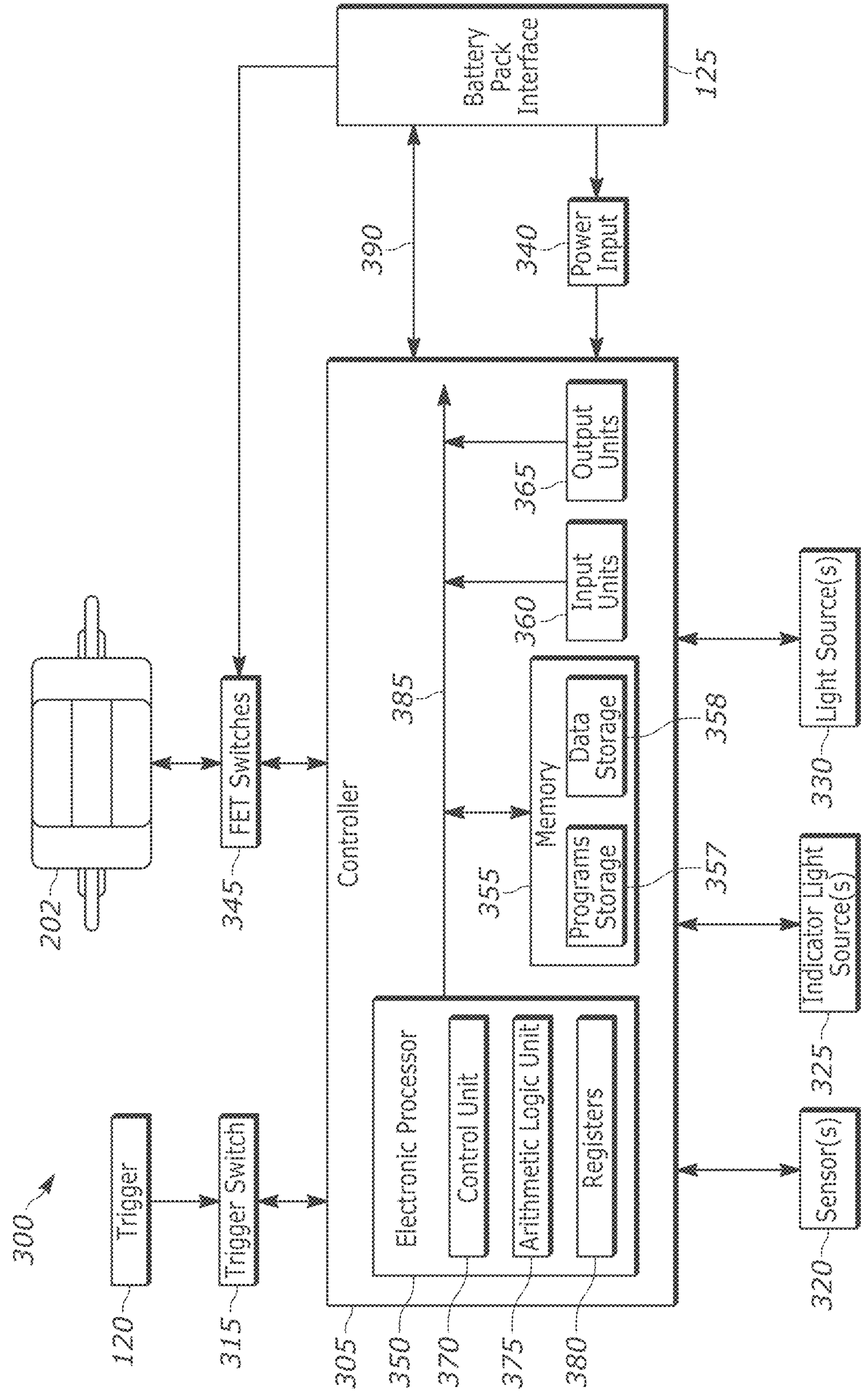
FIG. 3 illustrates a block diagram of the power tool of FIG. 1, according to some embodiments described herein.

FIG. 3 illustrates a block diagram 300 of the power tool 100 according to one example embodiment. The power tool 100 may include a controller 305. The controller 305 is electrically and/or communicatively connected to a variety of modules or components of the power tool 100. For example, as illustrated by FIG. 3, the controller 305 is electrically connected to the motor 202, a battery pack interface 125, a trigger switch 315 (connected to the trigger 120), one or more sensors or sensing circuits 320, one or more indicator light sources 325 (e.g., LEDs configured to be controlled to illuminate a status of the power tool 100), one or more other light sources 330 (e.g., configured to illuminate a work area), power input circuitry 340, and switching elements 345 (e.g., FET switches 345). The controller 305 includes combinations of hardware and software that are operable to, among other things, control the operation of the power tool 100, monitor the operation of the power tool 100, activate the one or more indicator light sources 325 and/or light sources 330, etc.

The controller 305 includes a plurality of electrical and electronic components that provide power, operational control, and protection to the components and modules within the controller 305 and/or the power tool 100. For example, the controller 305 includes, among other things, an electronic processor 350 (e.g., a microprocessor, a microcontroller, or another suitable programmable device), a memory 355, input units 360, and output units 365. The electronic processor 350 includes, among other things, a control unit 370, an arithmetic logic unit (ALU) 375, and a plurality of registers 380 (shown as a group of registers in FIG. 3), and is implemented using a computer architecture (e.g., a modified Harvard architecture, a von Neumann architecture, etc.). The electronic processor 350, the memory 355, the input units 360, and the output units 365, as well as the various modules or circuits connected to the controller 305 are connected by one or more control and/or data buses (e.g., common bus 385). The control and/or data buses are shown generally in FIG. 3 for illustrative purposes. The use of one or more control and/or data buses for the interconnection between and communication among the various modules, circuits, and components would be understood by a person skilled in the art in view of the embodiments described herein.

The memory 355 is a non-transitory computer readable medium and includes, for example, a program storage area 357 and a data storage area 358. The program storage area 357 and the data storage area 358 can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The electronic processor 350 is connected to the memory 355 and executes software instructions that are capable of being stored in a RAM of the memory 355 (e.g., during execution), a ROM of the memory 355 (e.g., on a generally permanent basis), or another non-transitory computer readable medium such as another memory or a disc. Software included in the implementation of the power tool 100 can be stored in the memory 355 of the controller 305. The software includes, for example, firmware, one or more applications, program data, filters, rules, one or more program modules, and other executable instructions. The controller 305 is configured to retrieve from the memory 355 and execute, among other things, instructions related to the control processes and methods described herein. In other constructions, the controller 305 includes additional, fewer, or different components.

The battery pack interface 125 includes a combination of mechanical components (e.g., rails, grooves, latches, etc.) and electrical components (e.g., one or more terminals) configured to and operable for interfacing (e.g., mechanically, electrically, and communicatively connecting) the power tool 100 with a battery pack 127. For example, power provided by the battery pack 127 to the power tool 100 is provided through the battery pack interface 125 to the power input circuitry 340. The power input circuitry 340 includes combinations of active and passive components to regulate or control the power received from the battery pack 127 prior to power being provided to the controller 305. The battery pack interface 125 may also supply power to the FET switches 345 that are configured to selectively provide power to the motor 202 in accordance with instructions from the controller 305. The battery pack interface 125 also includes, for example, a communication line 390 configured to allow for communication between the controller 305 and the battery pack 127.

The indicator light sources 325 include, for example, one or more light-emitting diodes ("LEDs"). The indicator light sources 325 are configured to be controlled by the controller 305 to display conditions of, or information associated with, the power tool 100 and/or a battery pack 127 coupled to the power tool 100 via indicators near or on an external surface of the housing of the power tool 100. In some instances, the light source(s) 330 that form part of the work light assembly may be controlled to flash at a predetermined rate and/or a certain number of times to indicate status information of the power tool 100 and/or the battery pack 127 to a user.

In some embodiments, the controller 305 (specifically, the electronic processor 350) is configured to control whether power is provided to the light source(s) 330 (e.g., LEDs 330 that are part of the work light assembly) and/or the indicator light sources 325 that provide light to indicators. In some embodiments, the controller 305 may receive power from a power supply of the power tool 100 and provide power to the indicator light sources 325 and/or the light source(s) 330 directly. In such embodiments, the controller 305 may condition received power as appropriate before providing power to the indicator light sources 325 and/or the light source(s) 330, for example, via traces on the PCB 210 to which the indicator light sources 325 and/or the light source(s) 330 may be coupled (e.g., via wires). In other embodiments, the indicator light sources 325 and/or the light source(s) 330 may be electrically connected to the power supply (e.g., to the battery pack 127 via the battery pack interface 125 and one or more wires that connect the battery pack interface 125 to the PCB 210 to which the indicator light sources 325 and/or the light source(s) 330 are coupled) with a switch between the power supply and each of the indicator light sources 325 and/or the light source(s) 330. In such embodiments, the controller 305 may control the switch to allow or disallow power from being provided to each of the indicator light sources 325 and/or the light source(s) 330. In such embodiments, the electrical path from the power supply to the indicator light sources 325 and/or the light source(s) 330 may include conditioning circuitry similar to the power input circuitry 340 to regulate or control the power received by the indicator light sources 325 and/or the light source(s) 330 from the power supply.

The controller 305 may be configured to monitor tool conditions and/or user inputs (e.g., a position of the magnetic element of the user input dial 115) using the sensors 320. For example, the controller 305 may be configured to determine whether a fault condition of the power tool 100 is present and generate one or more control signals related to the fault condition. In some embodiments, the sensors 320 include one or more current sensors, one or more speed sensors, one or more Hall Effect sensors, one or more temperature sensors, etc. The controller 305 calculates or includes, within memory 355, predetermined operational threshold values and limits for operation of the power tool 100. For example, when a potential thermal failure (e.g., of a FET 345, the motor 202, etc.) is detected or predicted by the controller 305, power to the motor 202 can be limited or interrupted until the potential for thermal failure is reduced. If the controller 305 detects one or more such fault conditions of the power tool 100 or determines that a fault condition of the power tool 100 no longer exists, the controller 305 is configured to provide information and/or control signals to another component of the power tool 100 (e.g. the battery pack interface 125, the indicator light sources 325, etc.).

Figure 4A:
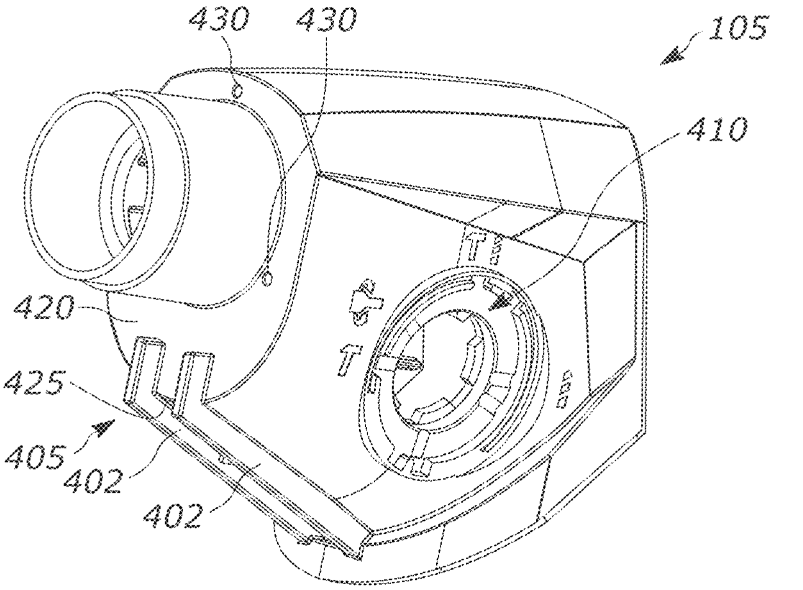
FIGS. 4A and 4B illustrate perspective views of a gear case of the power tool of FIG. 1, according to some embodiments described herein.
Figure 4B:
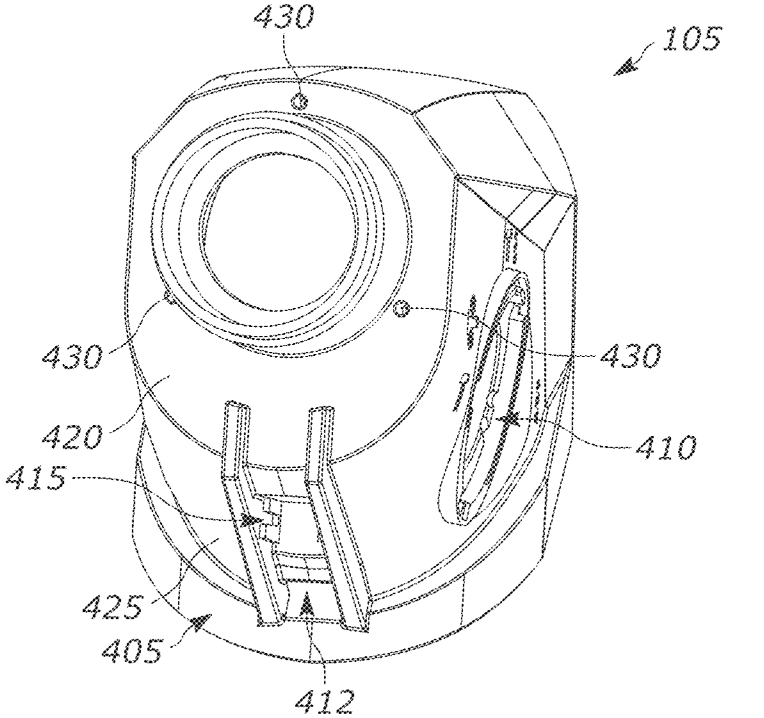

FIGS. 4A and 4B illustrate perspective views of the gear case 105 of the power tool 100 according to some example embodiments. The gear case 105 may include two protrusions 402 that define a channel 405 on a front surface 420 of the gear case 105 that runs down and along a bottom peripheral surface 425 of the gear case 105. An extending arm 510 of the light holder 110 (see FIGS. 5A-5C) may be located within the channel 405. Power wires 515A (see FIG. 5D) that provide power to the light sources/LEDs 330 of the work light assembly may also be located in the channel 405 and may be covered/protected by the extending arm 510 of the light holder 110 and by the protrusions 402 that form the channel 405. The channel 405 may lead to a hole 412 near a rear of the gear case 105 through which the lighting power wires 515A may pass into the housing of the power tool 100, for example, to couple to the PCB 210 to receive power. For example, once the lighting power wires 515A enter the housing of the power tool 100, the wires 515A may be routed over the top of the motor 202, underneath the motor 202, or around the side of the motor 202 along an inner surface of the clamshell housing 102 to couple to the PCB 210 (e.g., via soldering, a connector, or the like).

As shown in FIG. 4B, a shelf 415 may be included within the channel 405. The shelf 415 may be configured to hold the PCB 205 (or other type of substrate/mounting structure on which a sensor, such as a Hall sensor, another magnetic sensor, and/or another type of sensor, may be located) shown in FIGS. 2A and 2B such that the PCB 205 is located near an area 410 of the gear case 105 configured to receive the user input dial 115. Mounting the PCB 205 in such a location may allow the Hall sensor on the PCB 205 to detect the presence, absence, and/or position of a magnetic element included in/on the user input dial 115. Sensor wires (not shown) coupled to the PCB 205 may run along a similar path as the power wires 515A of the work light assembly (e.g., through the hole 412 near the rear of the gear case 105 and into the main housing of the power tool 100 to the PCB 210). In some instances, the Hall sensor may be mounted on the top side of the PCB 205 that is closer to the user input dial 115 (e.g., see FIG. 7). In some instances, the PCB 205 may be secured within the shelf 415 and/or the channel 405 using glue, epoxy, or the like. In some instances, the lighting power wires 515A may not be mounted to or otherwise contact the PCB 205 as the wires 515A travel within the channel 405 to the inside of the housing of the power tool 100.

Figure 5A:
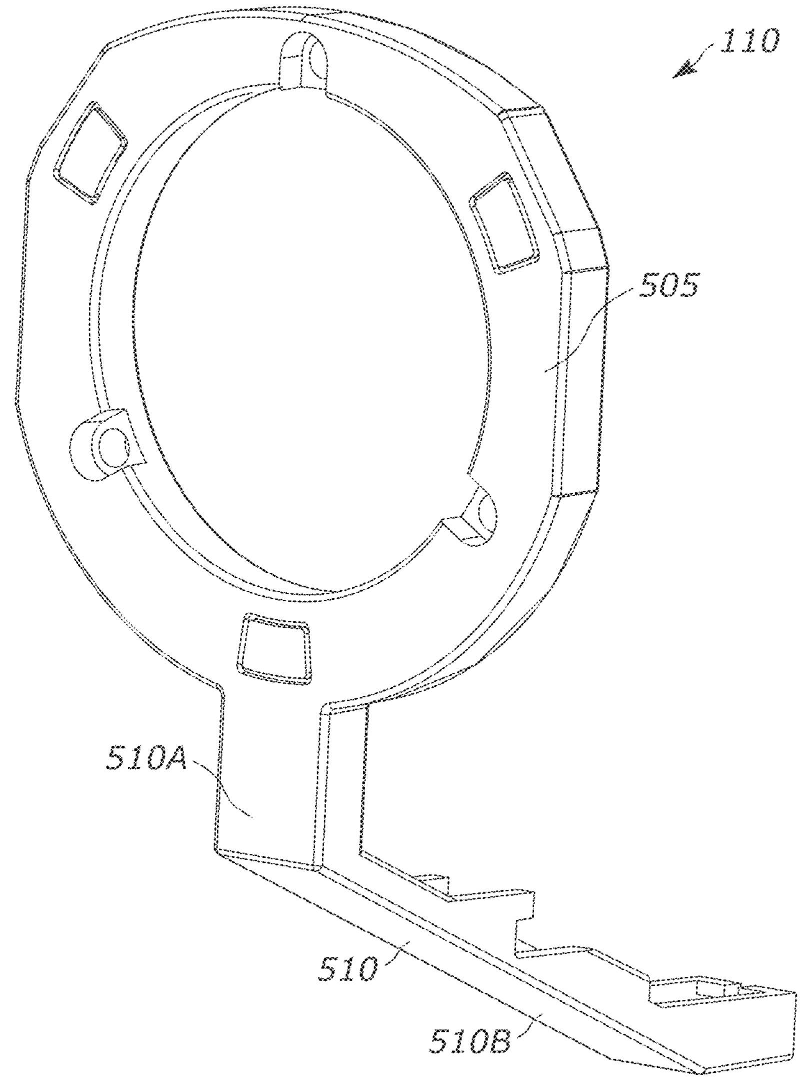
FIG. 5A illustrates a front perspective view of a light holder of a work light assembly of the power tool of FIG. 1, according to some embodiments described herein.
Figure 5B:
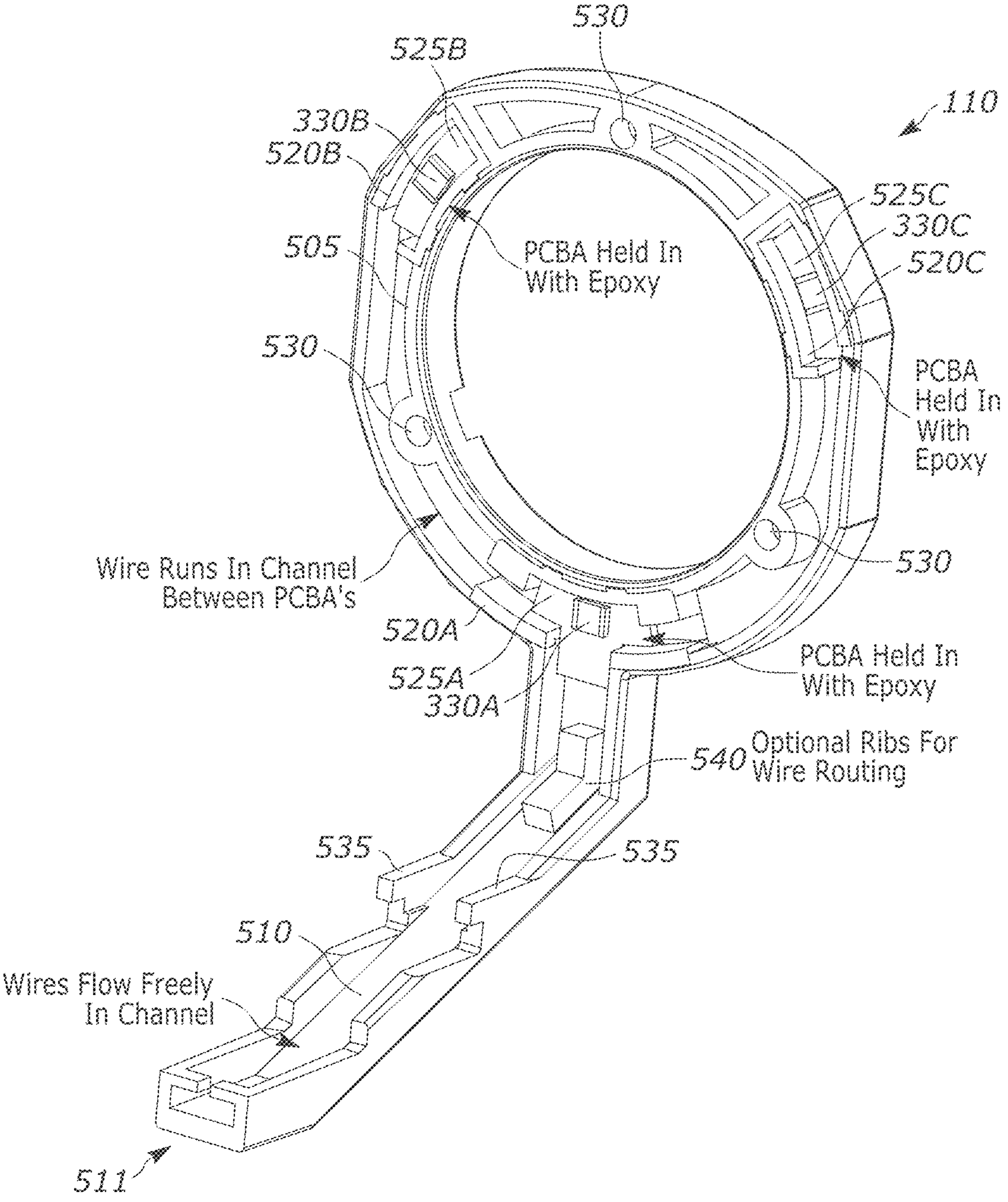
FIG. 5B illustrates a rear perspective view of the light holder of FIG. 5A, according to some embodiments described herein.
Figure 5C:
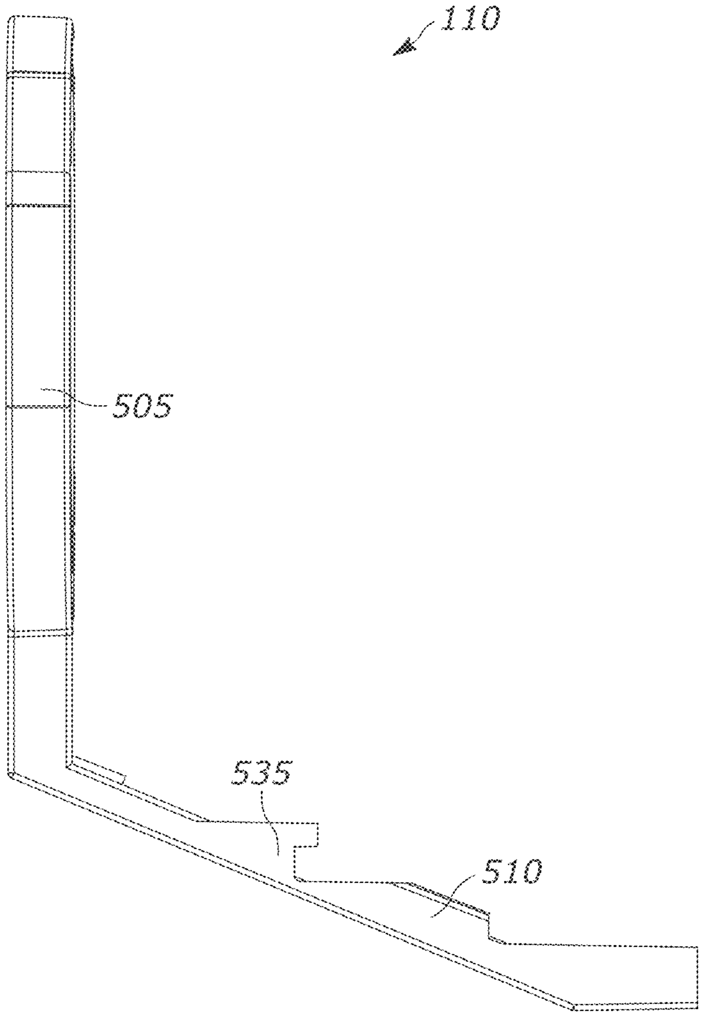
FIG. 5C illustrates a side view of the light holder of FIG. 5A, according to some embodiments described herein.
Figure 5D:
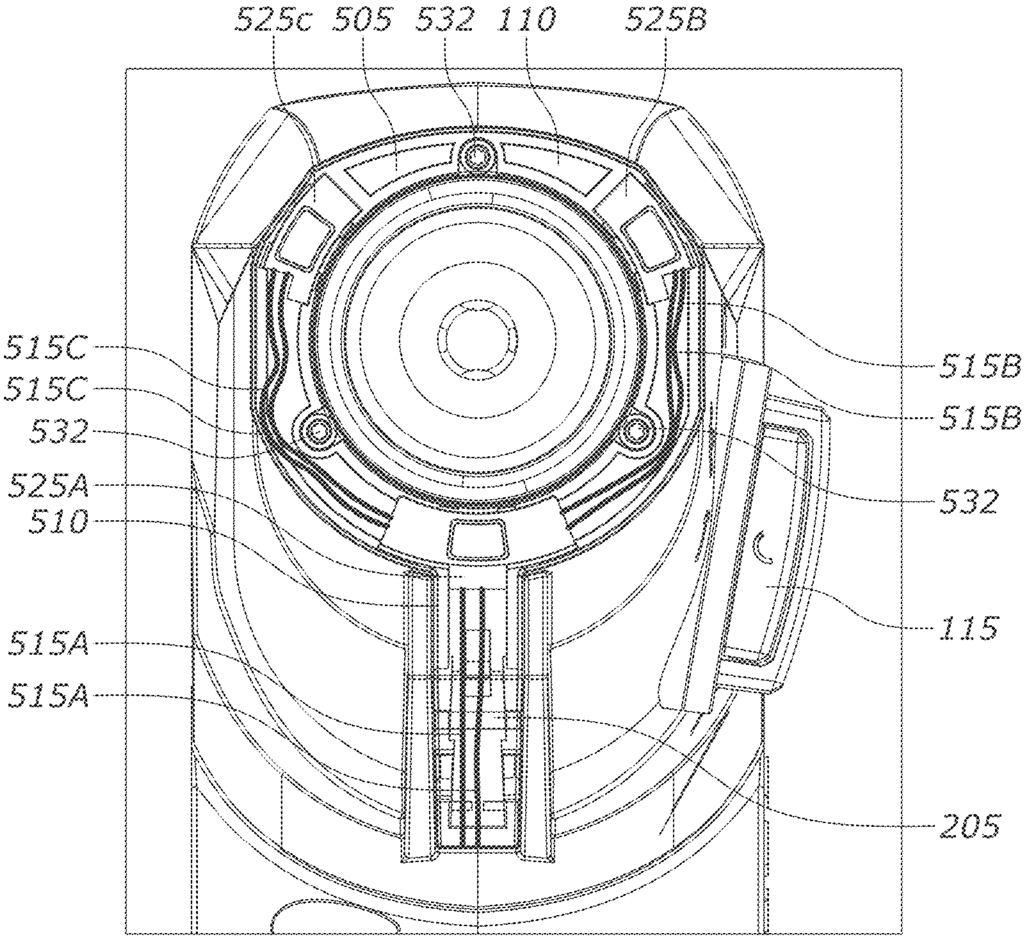
FIG. 5D illustrates a front view of the power tool of FIG. 1 with the light holder of FIG. 5A shown transparently, according to some embodiments described herein.
Figure 5E:
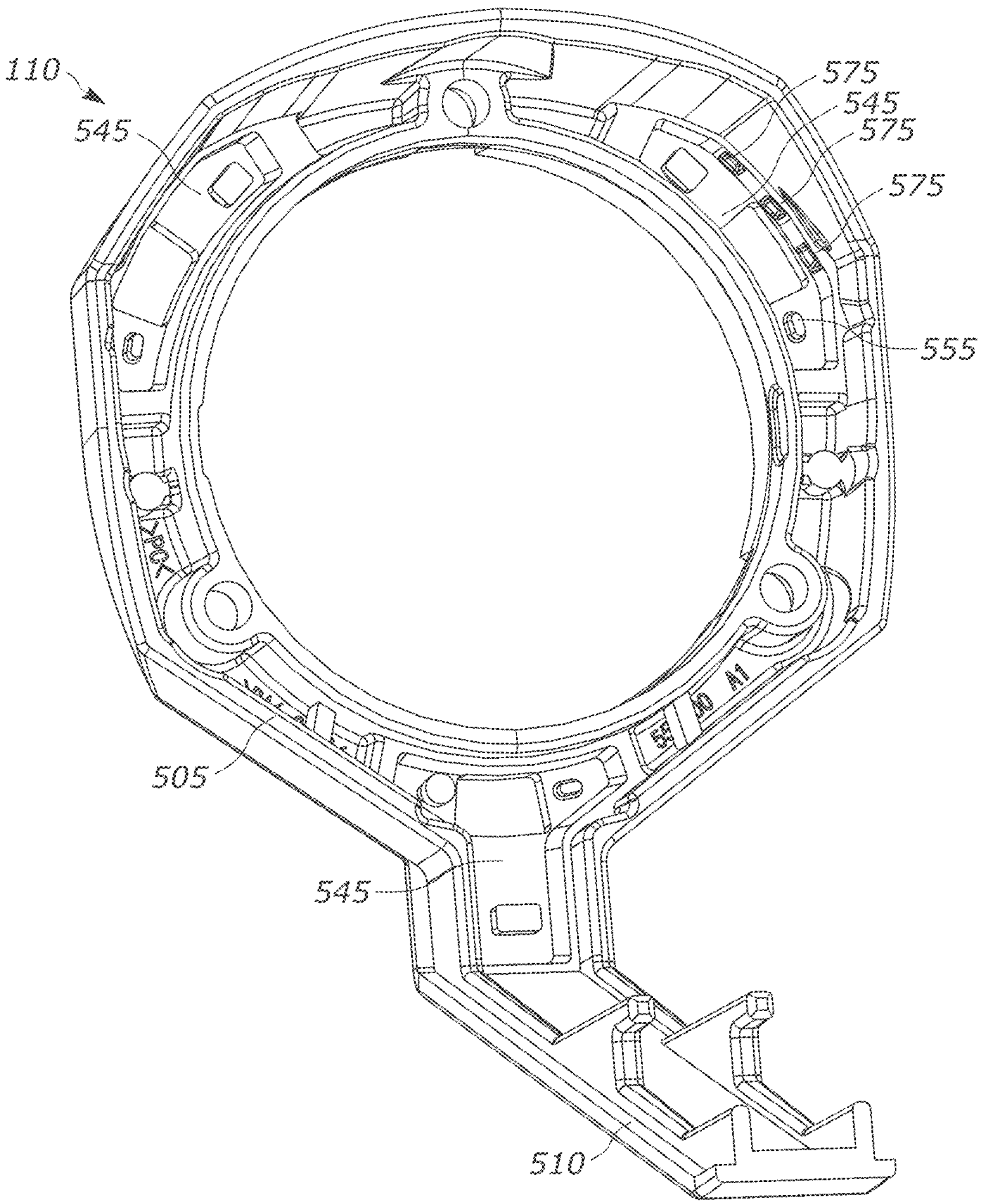
FIG. 5E illustrates a rear perspective view of another embodiment of the light holder 110 of FIG. 5A, according to some embodiments described herein.
Figure 5F:
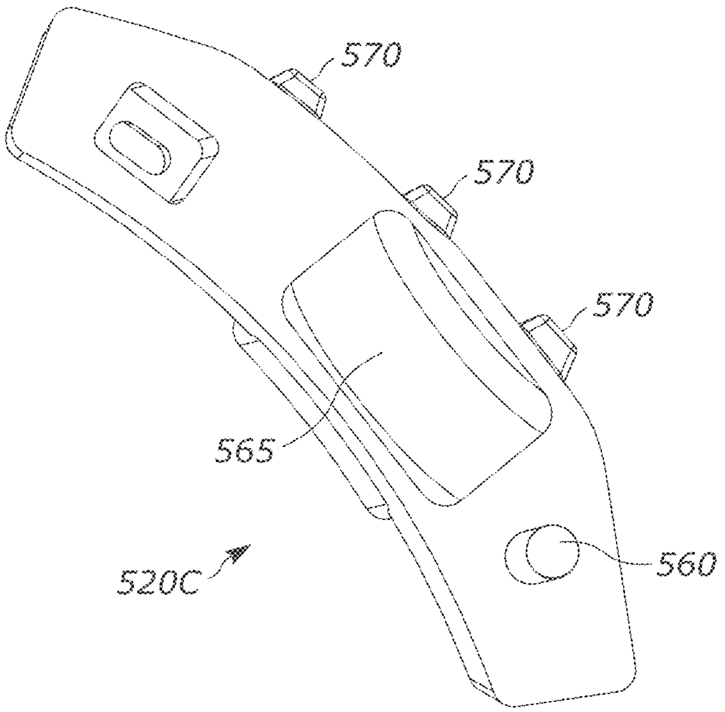
FIG. 5F illustrates a rear perspective view of a lens 520 of the light holder 110 of FIG. 5E, according to some embodiments described herein.
Figure 5G:
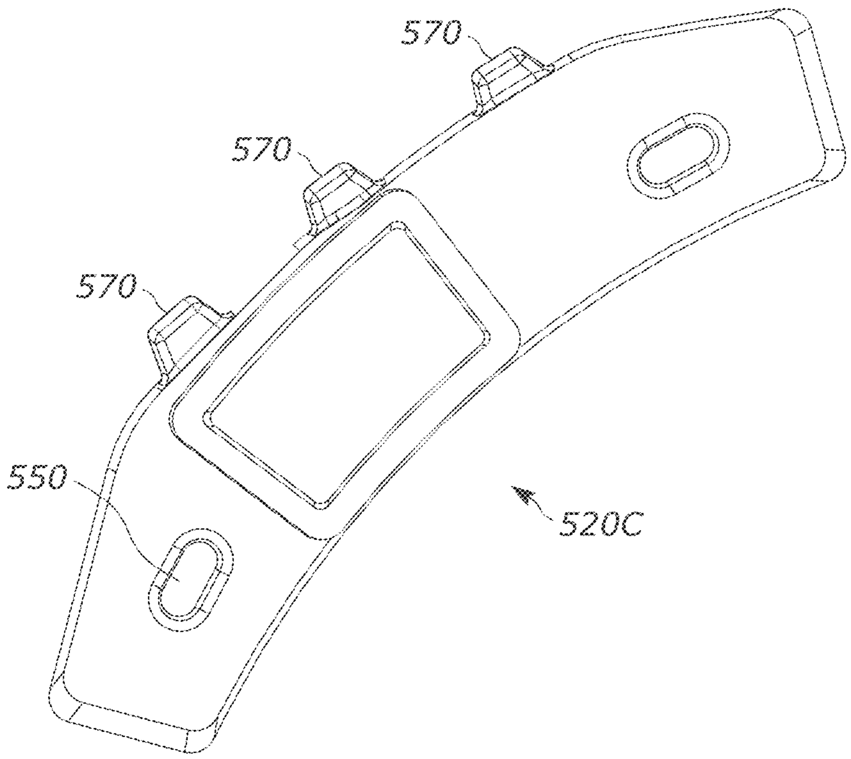
FIG. 5G illustrates a front perspective view of the lens 520 of the light holder 110 of FIG. 5E, according to some embodiments described herein.

FIG. 5A illustrates a front perspective view of the light holder 110 of the work light assembly of the power tool 100 of FIG. 1, according to some embodiments described herein. FIG. 5B illustrates a rear perspective view of the light holder 110 of FIG. 5A, according to some embodiments described herein. FIG. 5C illustrates a side view of the light holder 110 of FIG. 5A, according to some embodiments described herein. FIG. 5D illustrates a front view of the power tool 100 of FIG. 1 with the light holder 110 shown transparently, according to some embodiments described herein. FIG. 5E illustrates a rear perspective view of another embodiment of the light holder 110 of FIG. 5A, according to some embodiments described herein. In FIG. 5E, the lenses 520 and the LED PCBs 525 are not shown so as to allow features of the rear surface of the ring portion 505 of the light holder 110 to be visible. FIG. 5F illustrates a rear perspective view of a lens 520 of the light holder 110 of FIG. 5E, according to some embodiments described herein. FIG. 5G illustrates a front perspective view of the lens 520 of the light holder 110 of FIG. 5E, according to some embodiments described herein.

As shown in FIGS. 5A-5B, the light holder 110 may include a ring portion 505 that surrounds the output axis A of the power tool 100 and that includes portions configured to receive lenses 520 and LED PCBs 525. In some instances, the lenses 520 and the LED PCBs 525 are mounted to the light holder 110 using glue, epoxy, or the like. In some instances, a rear surface of the ring portion 505 includes indented portions 545 configured to receive the lenses 520 (see FIG. 5E). These indented portions 545 may be approximately the same size and shape as the lenses 520 to allow a lens 520 to fit in the indented portion 545. In some instances, such indented portions 545 may further include locating tabs, pegs, holes, etc. to ensure that each lens 520 is installed in the proper orientation in the ring portion 505. For example, a hole or indent 550 on a front surface of each lens 520 (see FIG. 5G) may be configured to fit over a peg 555 on an indented portion 545 of the rear surface of the ring portion 505 to ensure that the lenses 520 are installed properly in the ring portion 505. In some instances, the lenses 520 may also include locating tabs, pegs, holes, etc. to ensure that each LED PCB 525 is installed on its respective lens 520 in the proper orientation. For example, a hole or indent on a front surface of each LED PCB 525 may be configured to fit over/around a peg 560 on a rear surface of its respective lens 520 (see FIG. 5F) to ensure that the LED PCBs 525 are installed properly on the rear surface of the lenses 520. Each lens 520 also may include an indentation 565 on its rear surface that allows the light source/LED 330 on the LED PCB 525 to protrude forwardly into the indentation 565. In some instances, the indentation 565 on the lens 520 includes a curved and/or rounded shape to emit light from the light source 330 outward toward the output device 130 (e.g., in a dispersed manner). In some instances, an outer peripheral surface of the lenses 520 includes one or more protrusions 570 that are configured to fit (e.g., snap fit) into corresponding holes/indents 575 on an inner peripheral surface of the ring portion 505 (e.g., an inner peripheral surface of the indented portion 545) to secure or to help secure the lenses 520 in the ring portion 505. Although FIGS. 5E-5G primarily show a lens 520C and associated components of the ring portion 505, the features described and shown may also be included on other lenses 520 and their associated components of the ring portion 505.

The ring portion 505 may also include three (or more or less) through-holes 530 configured to receive fasteners 532 (e.g., screws, etc.) that are secured to holes 430 on the front surface 420 of the gear case 105 to secure the light holder 110 to the gear case 105. While the through-holes 430 are shown as being located on a flat portion the front surface 420, in some instances, one or more of the through-holes 430 may be located on a forwardly protruding surface (e.g., a standoff, a raised surface that surrounds a forwardly protruding neck portion of the gear case 105, etc.) of the front surface 420. In some instances, the light holder 110 may be secured to the gear case 105 in additional or alternative manners. For example, a neck of the gear case 105 around which the ring portion 505 of the light holder 110 is installed may include a ridge/rib or an indent to allow corresponding portions of the light holder 110 to snap fit to the ridge/rib or indent (or to a separate snap fit ring located within the indent) to secure the light holder 110 to the gear case 105.

The light holder 110 also may include the extending arm 510 that extends within the channel 405 of the gear case 105 to cover/protect the work light power wires 515A, the PCB 205, and the sensor wires running from the PCB 205. In some embodiments, a rear end of the extending arm 510 is configured to be inserted/friction fit into the hole 412 located near the rear of the gear case 105. As shown in FIG. 5B, there may be a hole 511 in the rear of extending arm 510 to allow the wires 515A and the sensor wires connected to the PCB 205 to pass through the hole 511 in the arm 510 and through the hole 412 in the gear case 105 and into the main housing of the power tool 100, for example, to couple to the PCB 210. Routing the wires 515A and the sensor wires connected to the PCB 205 in the channel 405 on an outer peripheral surface of the gear case 105 that is covered by the extending arm 510 allows the wires to be protected while avoiding the wires being routed through greasy areas caused by grease from gears/the transmission mechanism within the gear case 105. In some instances, the light holder 110 may be a molded member made of plastic or resin.

Figure 7:
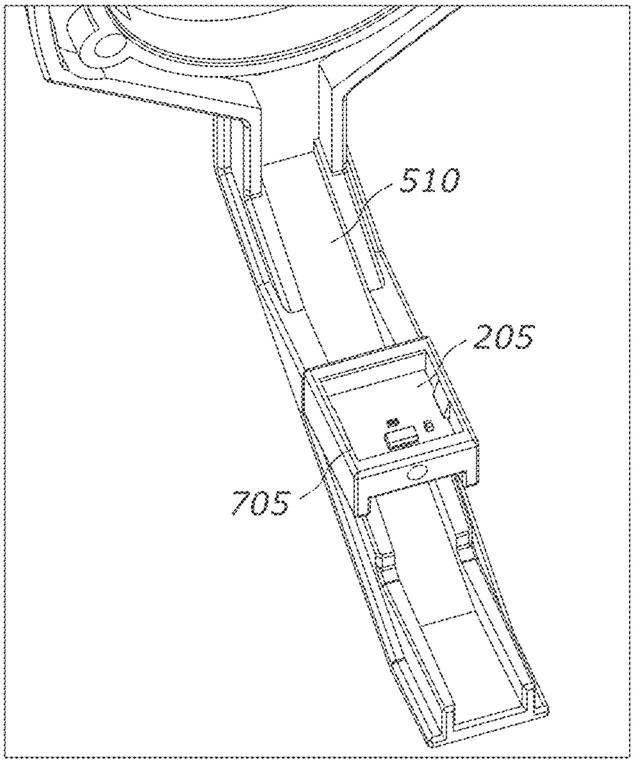
FIG. 7 illustrates a perspective view of another instance of a light holder of a work light assembly of the power tool of FIG. 1, according to some embodiments described herein.
Figure 8A:
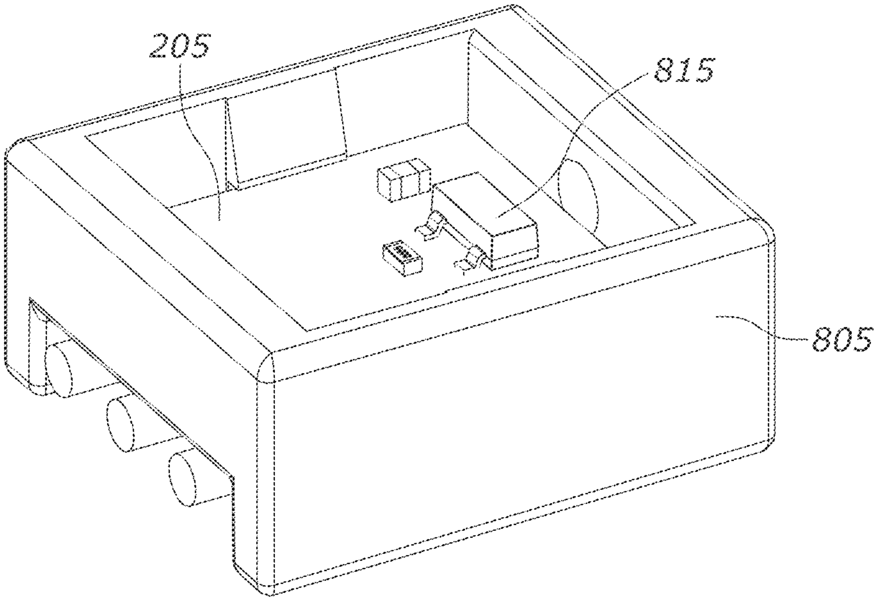
FIG. 8A illustrates a top perspective view of a potting boat that houses a printed circuit board (PCB) of the power tool of FIG. 1, according to some embodiments described herein.
Figure 8B:
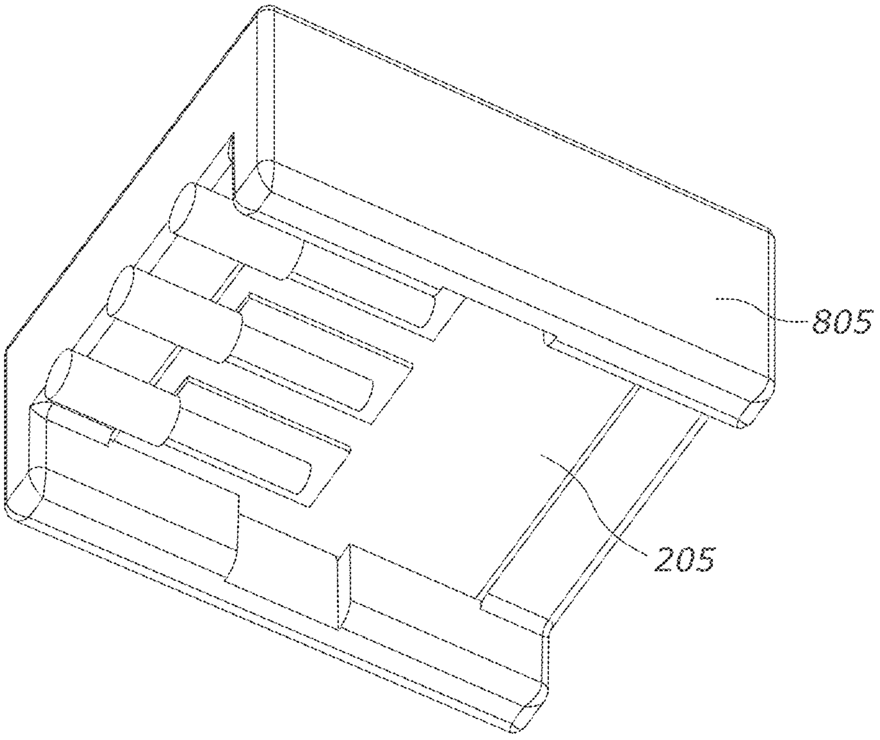
FIG. 8B illustrates a bottom perspective view of the potting boat and the PCB of FIG. 8A, according to some embodiments described herein.
Figure 8C:
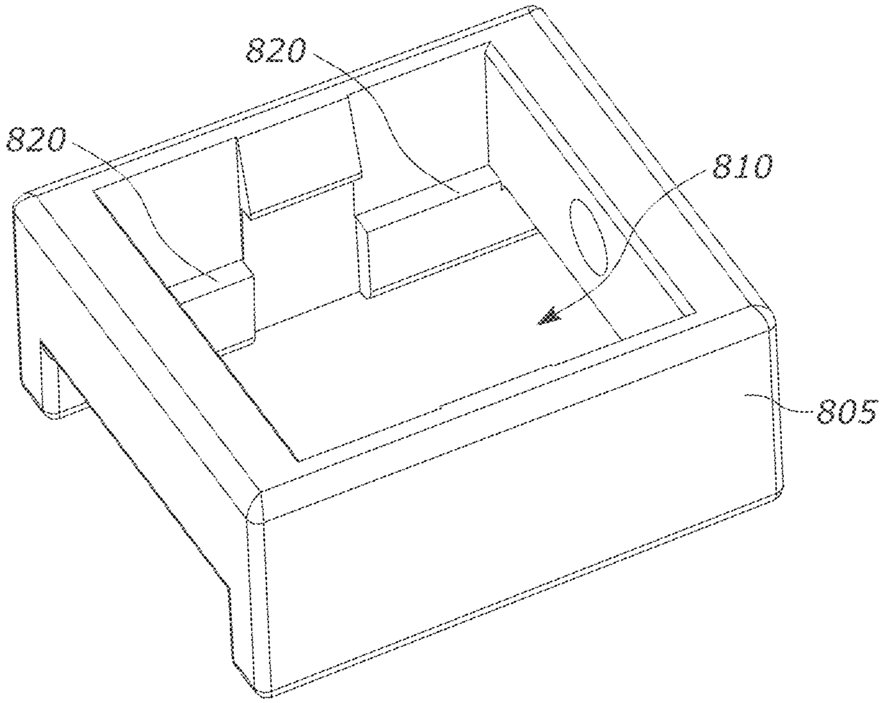
FIG. 8C illustrates a top perspective view of the potting boat of FIG. 8A with the PCB removed, according to some embodiments described herein.
Figure 8D:
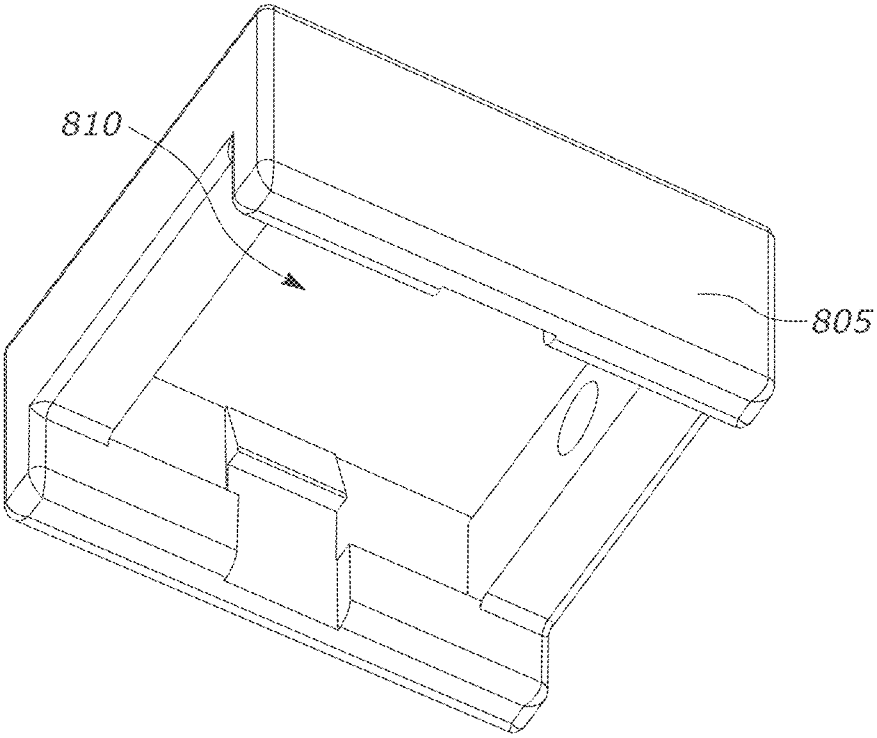
FIG. 8D illustrates a bottom perspective view of the potting boat of FIG. 8A with the PCB removed, according to some embodiments described herein.

In some embodiments, the extending arm 510 includes one or more portions/protrusions 535 that are configured to contact the PCB 205 in order to secure or support the PCB 205 and/or to prevent movement of the PCB 205 in at least one direction (e.g., in conjunction with the shelf 415 of the channel 405 of the gear case 105). For example, the protrusions 535 may be configured to contact the PCB 205 to prevent the PCB 205 from moving axially forward in a direction parallel to the output axis A. In some instances, the gear case 105 may not include the shelf 415 or the shelf 415 may be smaller or larger. In some of such instances, the extending arm 510 of the light holder 110 may include its own shelf/extension portion 705 to support the PCB 205 within the channel 405 as shown in FIG. 7. The shelf 705 may act as a potting boat for the PCB 205 and, in some instances, edges of the shelf may protrude upward to surround and secure the PCB 205 as shown in FIG. 7. The PCB 205 may be secured within the shelf 705 using glue, epoxy, or the like.

As shown in FIGS. 8A-8D, in some instances, a potting boat 805 that holds the PCB 205 may be a separate piece that is not integrated with the extending arm 510. In some instances, the portions/protrusions 535 on the extending arm 510 are configured to contact the potting boat 805 in order to secure or support the potting boat 805 and/or to prevent movement of the potting boat 805 in at least one direction (e.g., in conjunction with a larger version of the shelf 415 of the channel 405 of the gear case 105). For example, the protrusions 535 may be configured to contact the potting boat 805 to prevent the potting boat 805 from moving axially forward in a direction parallel to the output axis A. As shown in FIGS. 8A-8D, the potting boat 805 may include an opening 810 such that a portion of a bottom surface of the PCB 205 is exposed inside the channel 405, for example, to receive wires that may be soldered to the PCB 205 (e.g., power wires and/or wires to provide a signal from a Hall sensor 815 to the electronic processor 350). The potting boat 805 may include protruding ledges 820 on an interior surface in order to support the PCB 205 while allowing a portion of the bottom surface of the PCB 205 to be exposed inside the channel 405. The protruding ledges 820 may be located on any one or a combination of the four interior surfaces of the potting boat 805. The PCB 205 may be secured within the potting boat 805 using glue, epoxy, or the like. The potting boat 805 may be secured within the shelf 415 of the channel 405 using glue, epoxy, or the like.

As shown in FIG. 5B, in some embodiments, the extending arm 510 includes one or more ribs/wire guides 540 to aid in wire routing of the lighting power wires 515A. In other embodiments, the one or more ribs/wire guides 540 are not included, and the lighting power wires 515A flow freely without being supported by the extending arm 510.

As shown in FIG. 5D, the lighting power wires 515A may connect a power source of the power tool 100 to the LED PCB 525A. Separate lighting power wires 515B and 515C may be respectively routed to each of the other two LED PCBs 525B and 525C from the LED PCB 525A. For example, the LEDs 330B and 330C may be connected in parallel with each other. Such a wire routing design may reduce an amount of wire that is used and/or space consumed by lighting power wires 515 compared to a wire routing scheme in which the LEDs 330C and 330C are connected in series, for example using wires that extend around all or nearly all of a circumference of the ring portion 505. Additionally, locating the LED PCB 525A at the six o'clock position around the output axis A of the power tool 100 allows the lighting power wires 515A to be shorter than if a LED PCB 525 is not located in the six o'clock position. Accordingly, assembly of the power tool 100 may be simplified.

In some instances, the lighting power wires 515B and 515C are supported by the ring portion 505 of the light holder 110 while the lighting power wires 515A are not supported by any portion of the light holder 110. For example, the lighting power wires 515B and 515C may be pressed into wire traps included on a rear inner surface of the ring portion 505 and/or may be glued, epoxied, or the like within a channel formed in the rear inner surface of the ring portion 505. In some instances, the lighting power wires 515A may be coupled to the LED PCB 525A by being soldered, using a connector that is supported by only the LED PCB 525A and that is not supported by the light holder 110, or the like.

As shown in FIGS. 5B and 5D, the LED PCB 525A may be a different shape than the LED PCBs 525B and 525C. For example, the LED PCB 525A may be an approximate/modified T-shape to include additional surface area to allow for connections of the lighting power wires 515A, 515B, and 515C. Although three separate PCBs 525 are shown in FIG. 5B, in some instances, a single ring-shaped PCB or partial ring-shaped PCB (e.g., a 270 degree circularly-shaped PCB with an open end) may be used to mount the LEDs 330. Additionally, in some instances, the power tool 100 may include more or fewer LEDs 330 (and corresponding LED PCBs 525) in the light holder 110. The LEDs 330 may be evenly distributed around the output axis A to attempt to provide approximately shadowless lighting of a work area. For example, as shown in FIG. 5D, the three LED PCBs 525 are spaced approximately 120 degrees from each other about the output axis A.

Figure 6:
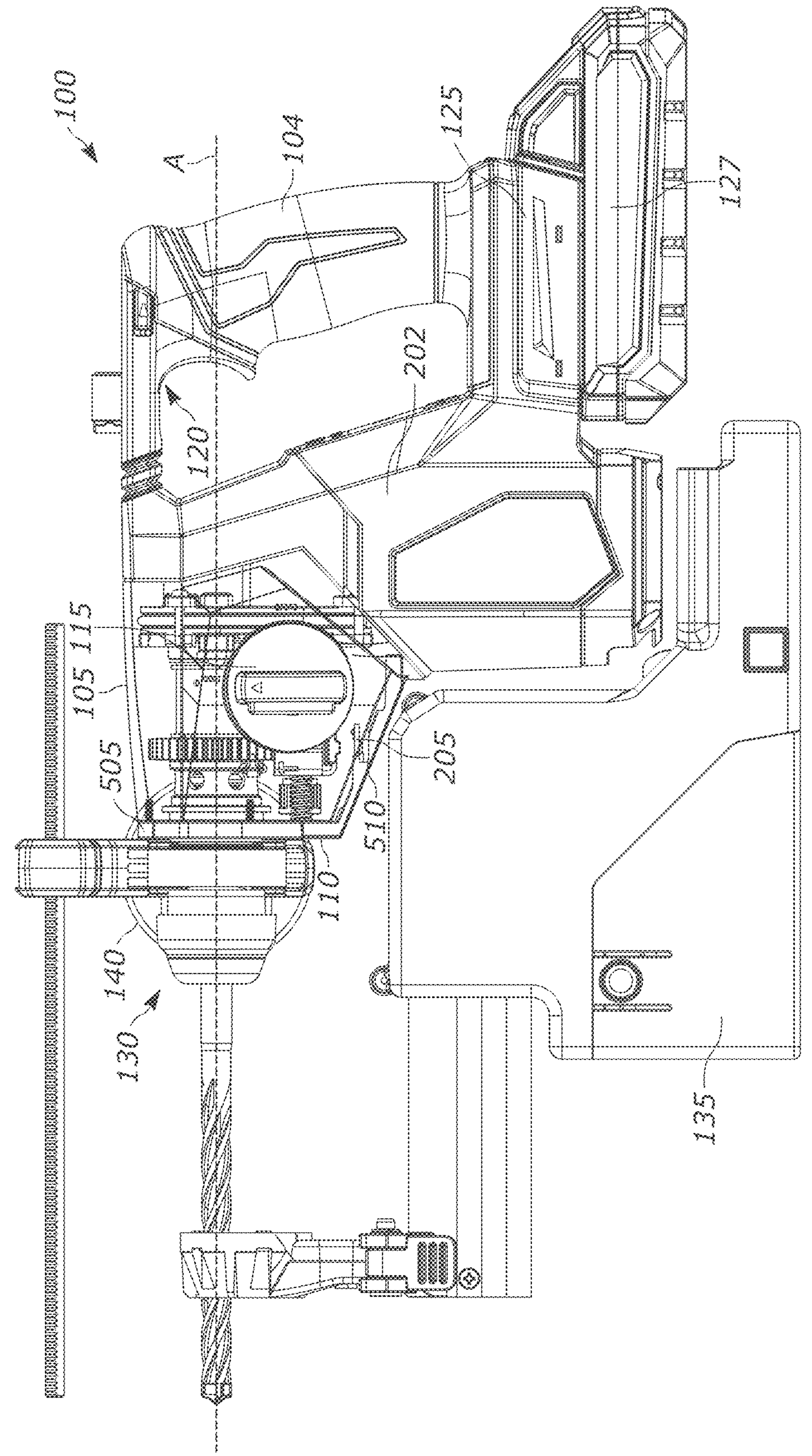
FIG. 6 illustrates a side profile view of the power tool of FIG. 1 with the gear case of FIGS. 4A and 4B shown transparently, according to some embodiments described herein.

FIG. 6 illustrates a side profile view of the power tool 100 of FIG. 1 with the gear case 105 shown transparently to make the light holder 110 easier to view. Along with other figures, FIG. 6 illustrates an axial length of the extending arm 510 of the light holder 110. In some instances, the extending arm 510 may extend from the ring portion 505 of the light holder 110 on the front surface 420 of the gear case 105 rearwardly at least or approximately halfway along an axial length (i.e., in a direction parallel to the output axis A) of the gear case 105. In some instances, the extending arm 510 may extend from the ring portion 505 of the light holder 110 on the front surface 420 of the gear case 105 rearwardly greater than halfway along the axial length of the gear case 105. In some instances, the extending arm 510 may extend from the ring portion 505 of the light holder 110 on the front surface 420 of the gear case 105 (which is located axially in front of the user input device 115) rearwardly in a direction parallel to the output axis A to a point that overlaps with an axial location of the user input device 115. For example, the extending arm 510 may extend past a halfway point of a length of the user input device 115 in a direction parallel to the output axis A as shown in FIG. 6. In some instances, as a portion of the extending arm 510 extends rearward toward the clamshell housing 102, the portion of the extending arm 510 may also extend downward at an angle from the ring portion 505. For example, a first portion 510A of the extending arm 510 may extend straight downward and a second portion 510B of the extending arm 510 may extend downward from the first portion 510A or the ring portion 505 at an angle of approximately 20 degrees, approximately 30 degrees, or the like from a horizontal axis parallel with the output axis A. The second portion 510B of extending arm 510 may extend at said angle along a corresponding bottom peripheral surface 425 of the gear case 105 that is orientated at the same angle as shown in FIG. 6 and as explained herein.

In some instances, the power tool 100 does not include the PCB 205 and/or the features associated with mounting/locating of the PCB 205. For example, the shelf 415 of the gear case 105, the protrusions 535 of the light holder 110, the shelf 705 of the light holder 110, and/or the potting boat 805 may not be present in some instances. In some instances, the protrusions 535 and the shelf 415 or similar holding features may be included even when the PCB 205 is not included. For example, the protrusions 535 may be supported by the shelf 415 or another holding feature (e.g., one or more indentations in the channel 405) part way along the length of the extending arm 510. In some instances, the PCB 205 and/or magnetic sensor may be located elsewhere in the power tool 100 or may not be included at all. For example, a different user input device 115 may be included on the power tool 100 that does not utilize the magnetic sensor on the PCB 205.

Thus, embodiments described herein provide, among other things, a power tool with fiber optic cables used to transmit light to an exterior of the power tool to provide status information about the power tool. Various features and advantages are set forth in the following claims.

We claim:

1. A rotary hammer comprising:

a housing including a motor housing and a secondary housing;

a motor situated within the motor housing;

an output device configured to provide a rotational output, an axial hammering output, or both the rotational output and the axial hammering output;

a transmission mechanism configured to transmit rotational energy from the motor to the output device of the rotary hammer, wherein at least a portion of the transmission mechanism is situated within the secondary housing;

a light holder that includes a plurality of light sources distributed around an output axis of the rotary hammer on which the output device is located, wherein the light holder includes:

a ring portion mounted to a front surface of the secondary housing, wherein the ring portion surrounds the output axis, and an extending arm that extends downward and away from the ring portion in a channel of the secondary housing, wherein the channel is formed by protrusions on a bottom peripheral surface of the secondary housing, and wherein the extending arm extends rearwardly at least halfway along an axial length of the secondary housing in a direction parallel to the output axis; and lighting power wires configured to provide power to the plurality of light sources, wherein the lighting power wires are located within the channel and are covered by the extending arm;

wherein the light holder includes:

a first substrate located at a bottom of a rear surface of the ring portion, wherein a first light source is mounted to the first substrate;

a second substrate located on the rear surface of the ring portion, wherein a second light source is mounted to the second substrate; and a third substrate located on the rear surface of the ring portion, wherein a third light source is mounted to the third substrate;

wherein the lighting power wires couple to the first substrate; and wherein a first additional set of lighting power wires is coupled to the first substrate and the second substrate, and a second additional set of lighting power wires is coupled to the first substrate and the third substrate.

2. The rotary hammer of claim 1, wherein the secondary housing includes a hole at a rear of the channel through which the lighting power wires enter the housing of the rotary hammer.

3. The rotary hammer of claim 2, wherein a rear end of the extending arm is configured to be inserted into the hole at the rear of the channel of the secondary housing.

4. The rotary hammer of claim 1, wherein the first substrate is a different shape than the second substrate and the third substrate.

5. The rotary hammer of claim 1, wherein the second light source and the third light source are electrically connected in parallel with each other.

6. A rotary hammer comprising:
- a housing including a motor housing and a secondary housing;
- a motor situated within the motor housing;
- an output device configured to provide a rotational output, an axial hammering output, or both the rotational output and the axial hammering output;
- a transmission mechanism configured to transmit rotational energy from the motor to the output device of the rotary hammer, wherein at least a portion of the transmission mechanism is situated within the secondary housing;
- a light holder that includes a plurality of light sources distributed around an output axis of the rotary hammer on which the output device is located, wherein the light holder includes:
  - a ring portion mounted to a front surface of the secondary housing, wherein the ring portion surrounds the output axis, and
  - an extending arm that extends downward and away from the ring portion in a channel of the secondary housing, wherein the channel is formed by protrusions on a bottom peripheral surface of the secondary housing, and wherein the extending arm extends rearwardly at least halfway along an axial length of the secondary housing in a direction parallel to the output axis; and
- lighting power wires configured to provide power to the plurality of light sources, wherein the lighting power wires are located within the channel and are covered by the extending arm;
- wherein the ring portion includes a plurality of through-holes that are each configured to receive a fastener;
- wherein each fastener is received in a respective hole on the front surface of the secondary housing to secure the light holder to the secondary housing.

7. The rotary hammer of claim 6, wherein the secondary housing includes a hole at a rear of the channel through which the lighting power wires enter the housing of the rotary hammer.

8. The rotary hammer of claim 7, wherein a rear end of the extending arm is configured to be inserted into the hole at the rear of the channel of the secondary housing.

9. The rotary hammer of claim 6, wherein the light holder includes:
- a first substrate located at a bottom of a rear surface of the ring portion, wherein a first light source is mounted to the first substrate;
- a second substrate located on the rear surface of the ring portion, wherein a second light source is mounted to the second substrate; and
- a third substrate located on the rear surface of the ring portion, wherein a third light source is mounted to the third substrate;
- wherein the lighting power wires couple to the first substrate; and
- wherein a first additional set of lighting power wires is coupled to the first substrate and the second substrate, and a second additional set of lighting power wires is coupled to the first substrate and the third substrate.

10. The rotary hammer of claim 6, wherein a rear surface of the ring portion includes a plurality of indented portions that are each configured to receive a lens;
- wherein each lens includes an outer peripheral surface with a protrusion, wherein the protrusion is configured to fit into an indent on an inner peripheral surface of the ring portion;
- wherein the lens is configured to receive a substrate, and wherein a first light source is mounted to the substrate.

11. A rotary hammer comprising:
- a housing including a motor housing and a secondary housing;
- a motor situated within the motor housing;
- an output device configured to provide a rotational output, an axial hammering output, or both the rotational output and the axial hammering output;
- a transmission mechanism configured to transmit rotational energy from the motor to the output device of the rotary hammer, wherein at least a portion of the transmission mechanism is situated within the secondary housing;
- a light holder that includes a plurality of light sources distributed around an output axis of the rotary hammer on which the output device is located, wherein the light holder includes:
  - a ring portion mounted to a front surface of the secondary housing, wherein the ring portion surrounds the output axis, and
  - an extending arm that extends downward and away from the ring portion in a channel of the secondary housing and rearwardly at least halfway along an axial length of the secondary housing in a direction parallel to the output axis, wherein the channel is formed by protrusions on a bottom peripheral surface of the secondary housing; and
- lighting power wires configured to provide power to the plurality of light sources, wherein the lighting power wires are located within the channel and are covered by the extending arm.

12. The rotary hammer of claim 11, wherein the secondary housing includes a hole at a rear of the channel through which the lighting power wires enter the housing of the rotary hammer.

13. The rotary hammer of claim 12, wherein a rear end of the extending arm is configured to be inserted into the hole at the rear of the channel of the secondary housing.

14. The rotary hammer of claim 11, wherein the channel in the secondary housing includes a shelf configured to hold a substrate on which a sensor is mounted.

15. The rotary hammer of claim 11, wherein the light holder includes:
- a first substrate located at a bottom of a rear surface of the ring portion, wherein a first light source is mounted to the first substrate;
- a second substrate located on the rear surface of the ring portion, wherein a second light source is mounted to the second substrate; and
- a third substrate located on the rear surface of the ring portion, wherein a third light source is mounted to the third substrate;
- wherein the lighting power wires couple to the first substrate; and
- wherein a first additional set of lighting power wires is coupled to the first substrate and the second substrate, and a second additional set of lighting power wires is coupled to the first substrate and the third substrate.

16. The rotary hammer of claim 15, wherein the first substrate is a different shape than the second substrate and the third substrate.

17. The rotary hammer of claim 15, wherein the second light source and the third light source are electrically connected in parallel with each other.

18. The rotary hammer of claim 11, wherein the ring portion includes a plurality of through-holes that are each configured to receive a fastener;

wherein each fastener is received in a respective hole on the front surface of the secondary housing to secure the light holder to the secondary housing.

19. The rotary hammer of claim 11, wherein a rear surface of the ring portion includes a plurality of indented portions that are each configured to receive a lens;

wherein each lens includes an outer peripheral surface with a protrusion, wherein the protrusion is configured to fit into an indent on an inner peripheral surface of the ring portion;

wherein the lens is configured to receive a substrate, and wherein a first light source is mounted to the substrate.

* * * * *